United States Patent
Hanson et al.

(10) Patent No.: US 8,095,250 B2
(45) Date of Patent: Jan. 10, 2012

(54) REAL-TIME COMPENSATION OF INERTIAL SENSOR BIAS ERRORS UNDER HIGH SPIN RATE CONDITIONS

(75) Inventors: Timothy J. Hanson, Plymouth, MN (US); Drew A. Karnick, Blaine, MN (US)

(73) Assignee: Honeywell International Inc., Morristown, NJ (US)

( * ) Notice: Subject to any disclaimer, the term of this patent is extended or adjusted under 35 U.S.C. 154(b) by 420 days.

(21) Appl. No.: 12/470,237

(22) Filed: May 21, 2009

(65) Prior Publication Data

US 2010/0299003 A1 Nov. 25, 2010

(51) Int. Cl.
*G05D 1/08* (2006.01)
(52) U.S. Cl. ............... 701/4; 701/220; 701/23
(58) Field of Classification Search ............. 701/4, 220, 701/23–26; 244/45 A
See application file for complete search history.

(56) References Cited

U.S. PATENT DOCUMENTS

| | | | |
|---|---|---|---|
| 6,401,036 B1 | 6/2002 | Geier et al. | |
| 6,498,996 B1 * | 12/2002 | Vallot | 702/104 |
| 6,826,478 B2 * | 11/2004 | Riewe et al. | 701/220 |
| 6,853,947 B1 * | 2/2005 | Horton | 702/151 |
| 6,859,727 B2 * | 2/2005 | Bye et al. | 701/210 |
| 7,103,477 B1 | 9/2006 | Lee | |
| 7,257,512 B1 | 8/2007 | Ackerman | |
| 7,698,082 B2 * | 4/2010 | Lee | 702/88 |
| 2007/0100550 A1 | 5/2007 | Hawkinson | |
| 2010/0133374 A1 * | 6/2010 | Geswender et al. | 244/3.2 |

* cited by examiner

*Primary Examiner* — Drew Brown
(74) *Attorney, Agent, or Firm* — Fogg & Powers LLC (57) ABSTRACT

A method of estimating bias errors for an air vehicle in flight under high spin conditions is provided. The method comprises collecting a first set of data samples at a first time and collecting a second set of data samples at a second time. The first time and the second time occur after deployment of the air vehicle and before canard shock. The first and second sets of data samples comprise roll rate data from at least a first gyroscope and acceleration data from at least a first accelerometer. At least a first estimated accelerometer bias from the first and second sets of data samples is calculated.

20 Claims, 6 Drawing Sheets

REAL-TIME COMPENSATION OF INERTIAL SENSOR BIAS ERRORS UNDER HIGH SPIN RATE CONDITIONS

GOVERNMENT LICENSE RIGHTS

The U.S. Government may have certain rights in the present invention as provided for by the terms of Government Contract # DAAB07-03-D-B013 awarded by Raytheon Missile Systems & US Army.

BACKGROUND

An inertial measurement unit (IMU) is part of an inertial guidance system used in devices such as aircraft, vehicles, guided missiles, and guided bullets or munitions. The IMU uses accelerometers and gyroscopes to precisely sense motion. The data gathered by the IMU is used for flight control or to navigate the device the IMU is located within. One factor in IMU performance is the precision and accuracy of its inertial data. However, IMUs are subject to a number of potential errors which need correction or compensation. In particular, IMU applications which have high spin rates (for example, rounds leaving a rifled barrel at high speeds) can have errors occur in rate and acceleration estimations due to misalignment, non-centric spin axis errors, and mechanical mount variations of the device or of the IMU itself. Real-time compensation of such errors is desired in order to make guidance estimates and rate and acceleration values less sensitive to inaccuracies and variations in airframe or projectile geometry, and to decrease flight errors manifesting as periodic motion (such as precession) that produce errors in rate and acceleration.

SUMMARY

One embodiment provides a method of estimating bias errors for an air vehicle in flight under high spin conditions. The method comprises collecting a first set of data samples at a first time and collecting a second set of data samples at a second time. The first time and the second time occur after deployment of the air vehicle and before canard shock. The first and second sets of data samples comprise roll rate data from at least a first gyroscope and acceleration data from at least a first accelerometer. The method further comprises calculating at least a first estimated accelerometer bias from the first and second sets of data samples.

Another embodiment provides an air vehicle operable for real-time estimates of acceleration bias errors, the air vehicle comprising an airframe, an inertial measurement unit (IMU), a guidance system operable to deploy canards, and a processing unit. The IMU comprises a first gyroscope and at least a first and second accelerometer. The processing unit is configured to compensate for an output of the first accelerometer using a first calculated accelerometer bias, wherein the calculations are generated based on data from the first accelerometer after deployment of the air vehicle and before a canard shock, compensate for an output of the second accelerometer using a second calculated accelerometer bias wherein the calculations are generated based on data from the second accelerometer after deployment of the air vehicle and before the canard shock, and guide the flight of the air vehicle based on the compensated outputs of the first and second accelerometers.

Yet another embodiment provides a program product for determining bias errors in an inertial measurement unit (IMU) of an air vehicle, the program product comprising a processor-readable medium on which program instructions are embodied. The program instructions are operable, when executed by at least one programmable processor included in the air vehicle, to cause a guidance system of the air vehicle to collect a first set of data samples at a first time and collect a second set of data samples at a second time, wherein the first and second points in time are after deployment of the air vehicle. The first and second data samples comprise roll rate data from at least a first gyroscope and acceleration data from at least a first and second accelerometer. The program instructions are also operable to cause the guidance system to calculate at least a first and second estimated accelerometer bias.

The details of various embodiments of the claimed invention are set forth in the accompanying drawings and the description below. Other features and advantages will become apparent from the description, the drawings, and the claims.

DRAWINGS

Like reference numbers and designations in the various drawings indicate like elements.

DETAILED DESCRIPTION

Figure 1:
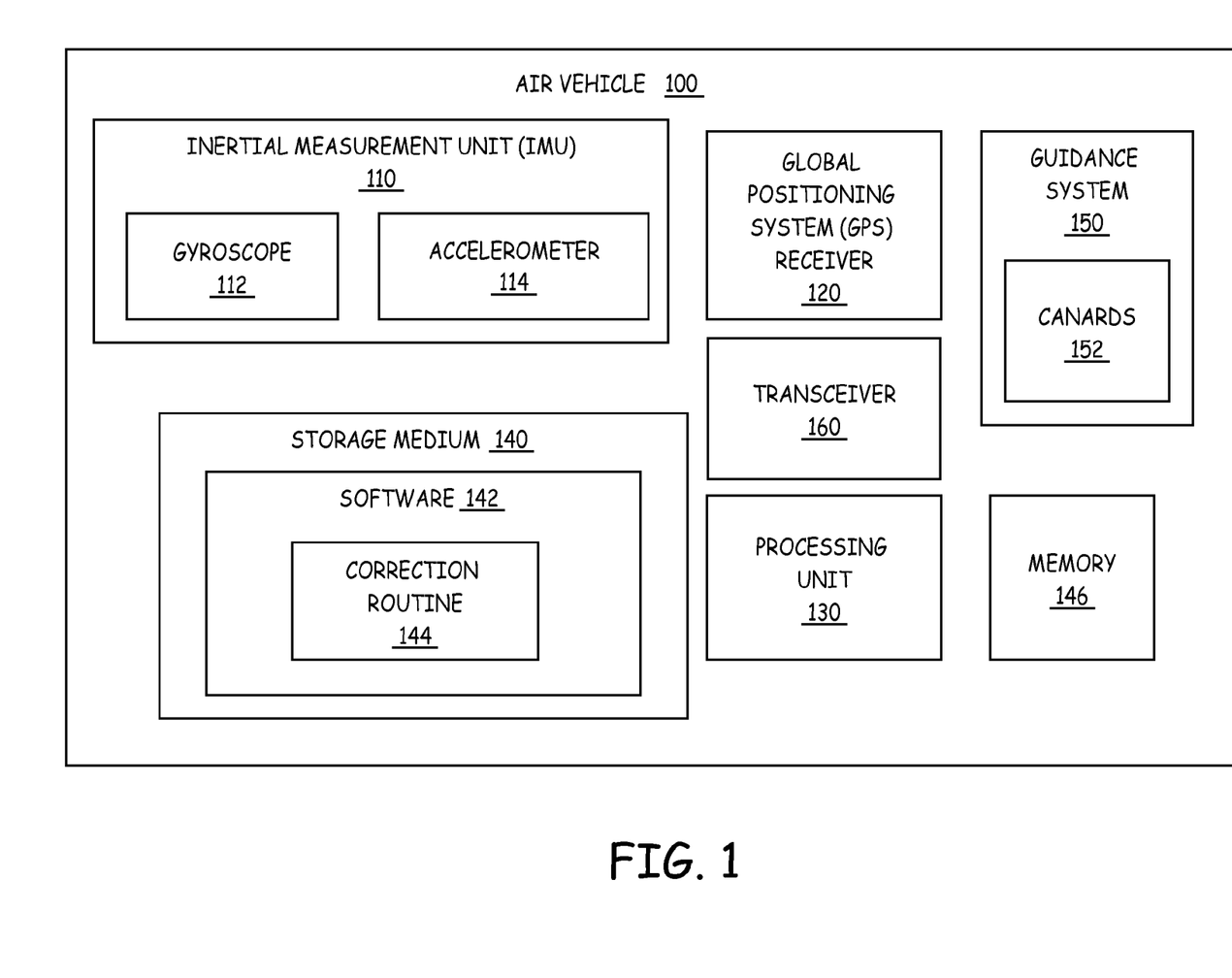
FIG. 1 is a block diagram depicting one embodiment of an air vehicle configured to run a bias correction routine.

FIG. 1 is a block diagram depicting one embodiment of an air vehicle 100 configured to run a bias correction routine 144. The air vehicle 100 comprises a projectile, a missile, a bullet, or the like. The air vehicle 100 comprises a body 102 (shown in FIG. 2), such as a fuselage or airframe. The air vehicle 100 is configured to determine its position using an inertial measurement unit (IMU) 110 and a global positioning system (GPS) receiver 120. The air vehicle 100 is also configured to navigate using the IMU 110 without GPS information. The IMU 110 provides acceleration and attitude data for the air vehicle 100. In one implementation of the embodiment shown in FIG. 1, the IMU 110 includes an accelerometer 114 for sensing a linear change in rate (that is, acceleration) along a given axis and a gyroscope 112 for sensing change in angular rate (that is, used to determine rotational velocity or angular position). The gyroscope 112 includes at least a first gyroscope with an input axis in the direction of motion of the air vehicle 100. The accelerometer 114 include at least a first and second accelerometer for measuring acceleration in directions orthogonal to each other and orthogonal to the gyroscope sensing spin rate of the airframe. The GPS receiver 120 provides the air vehicle 100 with position information when GPS is available. Alternative embodiments do not use or do not comprise a GPS receiver 120.

The air vehicle 100 flies to a target under guidance of a guidance system 150. The air vehicle 100 is initially under a high spin rate. Firing from a rifled barrel or being spun up by control surfaces (fins) are exemplary ways in which the air vehicle 100 is initially under a high spin rate. The guidance system 150 deploys canards 152. Canards 152 are small wings deployed after firing that are used to guide the air vehicle 100 during flight. Typically, a guidance system 150 comprises one or more pyrotechnic devices that explode during flight to deploy the canards 152. The deployment of the canards 152 is called a canard shock. The time before the canards 152 are deployed is referred to herein as the ballistic stage, and after the canards 152 are deployed is referred to herein as after the canard shock. The canards 152 can be used to slow or stop the rotation of the air vehicle 100, and even to spin the air vehicle 100 in the opposite direction. In one embodiment, the guidance system 150 is controlled by a processing unit 130. In other embodiments, the guidance system 150 further comprises a processing unit to control the other components of the guidance system 150.

Accuracy of the IMU 110 affects proper targeting of the air vehicle 100. If the IMU 110 has initial errors, the air vehicle 100 will fly with these errors. By reducing IMU 110 errors in the early stage of flight (the ballistic stage), the air vehicle 100 can be guided more accurately. Some errors can be compensated for and the flight path of the air vehicle 100 can be recalculated based upon compensation for the determined errors. Errors (or offsets) in rate and acceleration estimations due to misalignment, non-centric spin axis errors, or asymmetry of the air vehicle 100 and its components that occur before the canard shock can cause the air vehicle 100 to miss an intended target. Previous methods of estimating these bias errors applied only after the canards 152 were deployed, primarily through a comparison of IMU measurements to an external aiding source (such as a GPS), by applying a Kalman filter. The correction routine 144 can correct these errors and is applied much earlier in the mission, during the ballistic stage. The correction routine 144 is a real-time estimation routine that estimates a model of gyroscope and accelerometer errors as a function of roll-rate, time, and the geometry and orientation of the air vehicle 100. Such error estimates, determined during the ballistic stage, can be used to improve navigation and control of the air vehicle 100 more than is possible without such early error estimates.

Figure 3A:
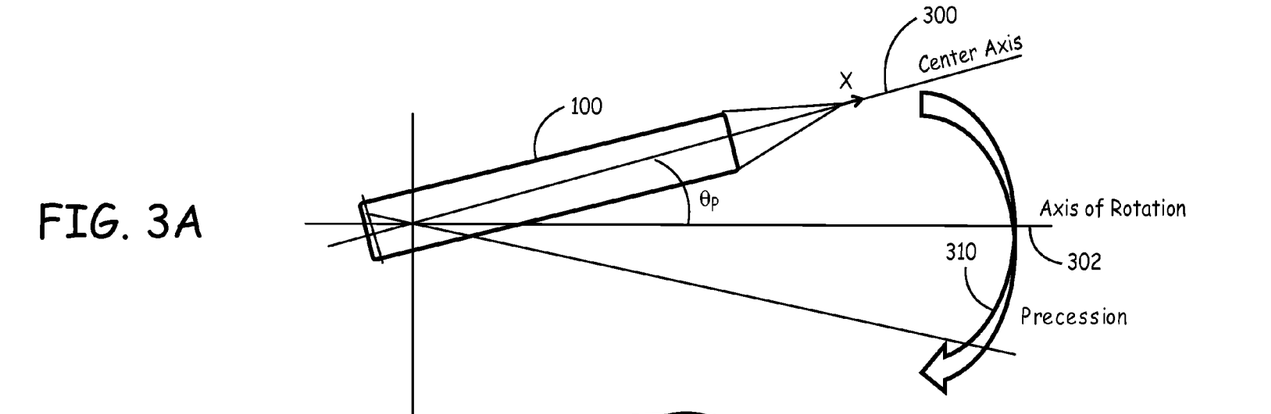
FIGS. 3A-3C are block diagrams of one embodiment of the geometry of an air vehicle.
Figure 3B:
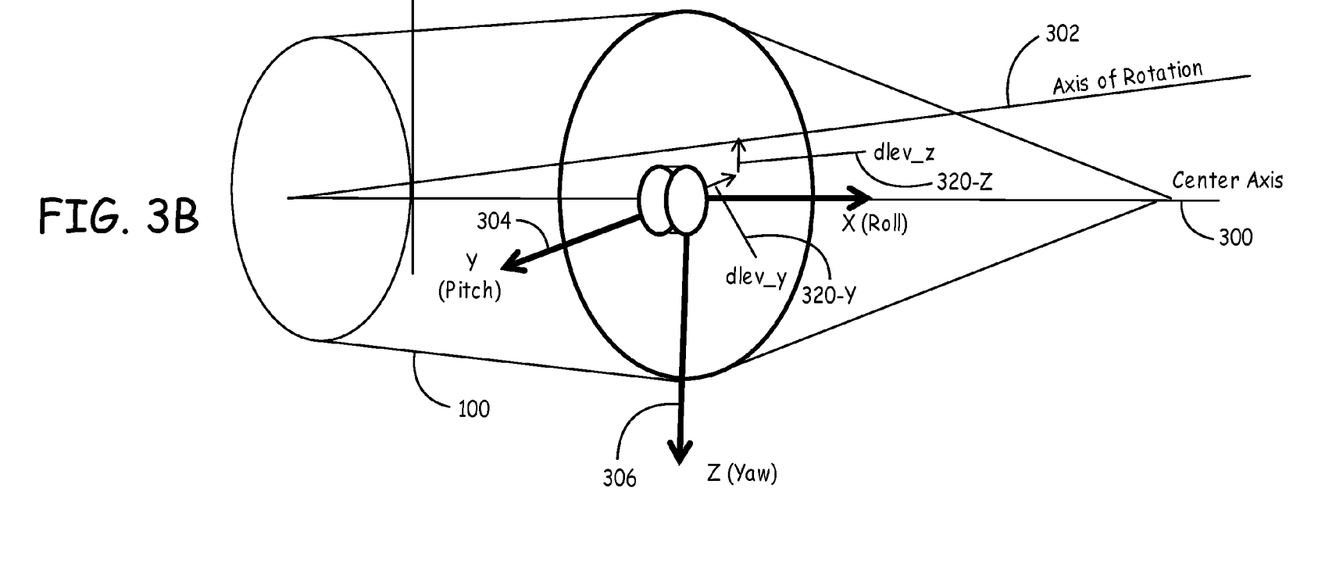
Figure 3C:
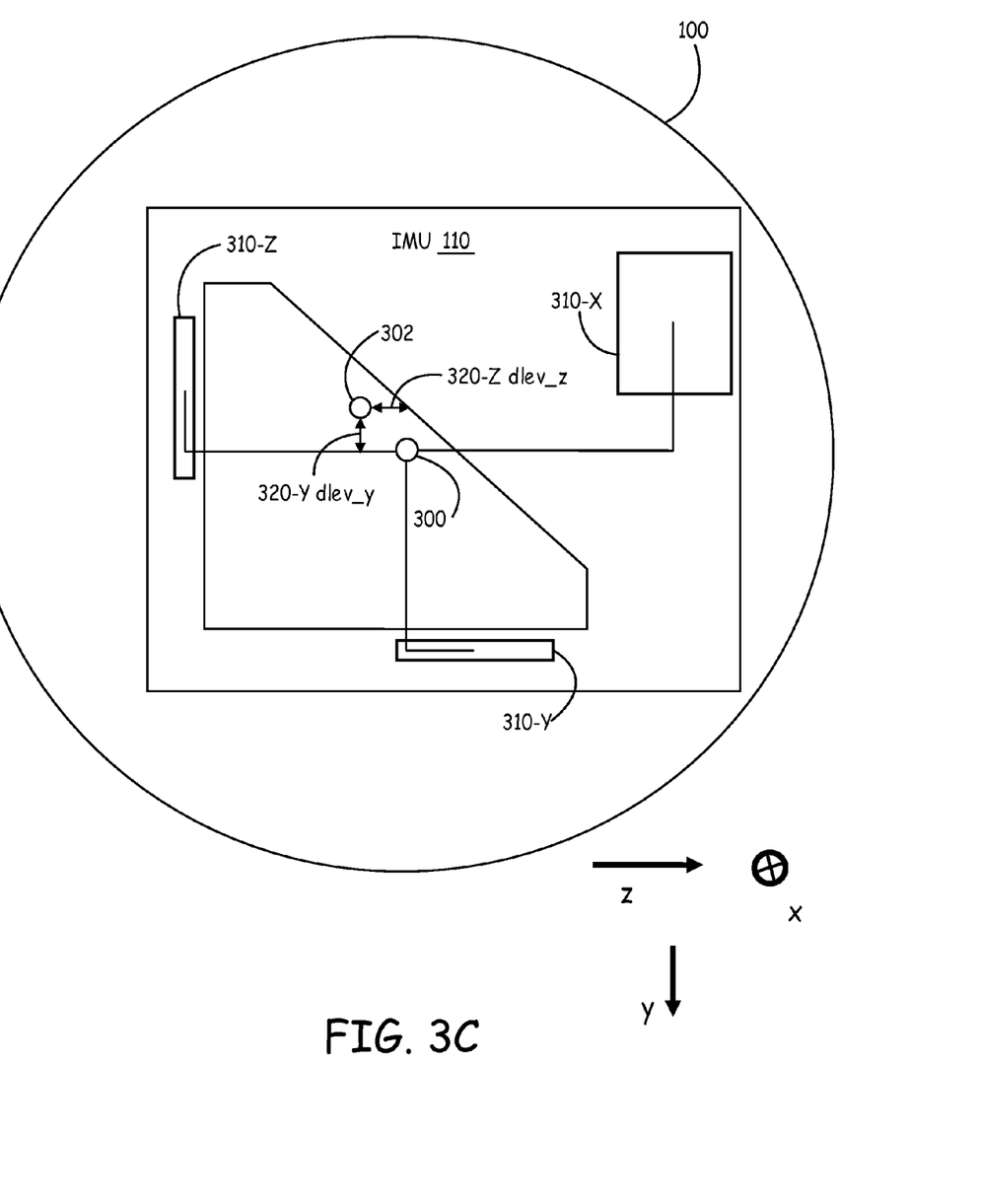

Two primary explanations for observed gyroscope and accelerometer offsets (seen primarily in the ballistic stage) are possible. The first is that the IMU 110 has misalignments and the air vehicle 100 is spinning about its centerline very precisely. The second explanation is that the IMU 110 has good alignments, but the air vehicle 100 is precessing about an angle. Precession and misalignment can occur within the same air vehicle 100. The second explanation where the air vehicle 100 is precessing is illustrated in FIGS. 3A-3C.

The air vehicle 100 comprises a processing unit 130 that is used to implement the correction routine 144. The correction routine 144 corrects for gyroscope and accelerometer errors under high spin rate conditions (that is, when the air vehicle 100 is spinning) and when the air vehicle 100 is experiencing predominantly ballistic flight (prior to canard deployment). In the embodiment shown in FIG. 1, the correction routine 144 is implemented in software 142 that is executed by the processing unit 130. The software 142 comprises program instructions that are stored on a suitable storage device or medium 140. Typically, a portion of the software 142 executed by the processing unit 130 and one or more data structures used by the software 142 during execution are stored in a memory 146. The air vehicle 100 also comprises a transceiver 160 for communicating to systems external to the air vehicle 100, such as a host airframe control system. The components of the air vehicle 100 are communicatively coupled to one another as needed using suitable interfaces and interconnects.

Figure 2:
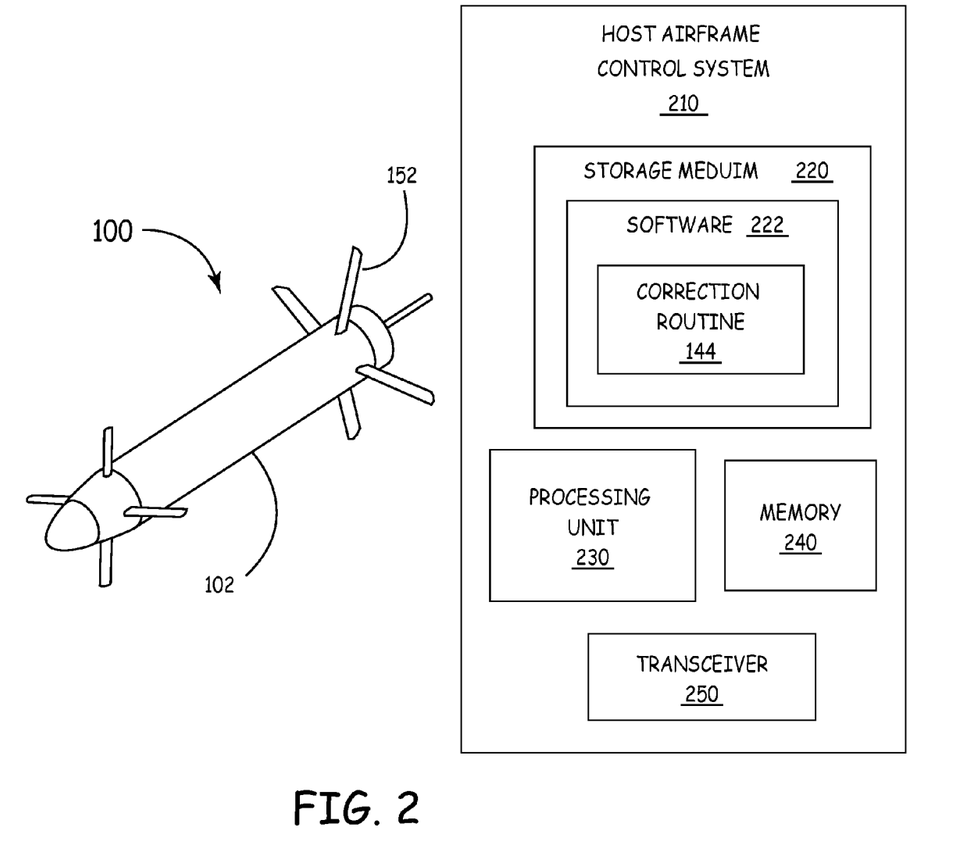
FIG. 2 is a block diagram of one embodiment of a host airframe control system configured to communicate with an air vehicle.

In alternative embodiments, the processing unit 130, memory 146, or storage medium 140 are located remote (physically, electronically, or both) from the IMU 110, for example, in a host airframe control system 210. FIG. 2 is a block diagram of one embodiment of the host airframe control system 210 configured to communicate with the air vehicle 100. The correction routine 144 is implemented in software 222 that is executed by a processing unit 230. The software 222 comprises program instructions that are stored on a suitable storage device or medium 220. Typically, a portion of the software 222 executed by the processing unit 230 and one or more data structures used by the software 222 during execution are stored in a memory 240. Therefore, the real-time correction routine 144 can be implemented either in the air vehicle 100, or in the host airframe flight control software 220 in the host airframe control system 210 (located external to the air vehicle 100).

The host airframe control system 210 is configured to communicate with the air vehicle 100 via a transceiver 250. The host airframe control system 210 transceiver 250 is configured to communicate with the air vehicle 100 transceiver 160. Data samples taken by the IMU 110 are transmitted to the host airframe flight control system 210 which calculates the accelerometer bias errors. Once the errors are calculated, the host airframe flight control system 210 transmits the corrections or updated flight guidance information to the air vehicle 100. This information is provided to the guidance system 150 for guiding the air vehicle 100. The components of the host airframe control system 210 are communicatively coupled to one another as needed using suitable interfaces and interconnects.

FIGS. 3A-3C are block diagrams of one embodiment of the geometry of an air vehicle 100. FIG. 3A depicts the air vehicle 100 flying along a center axis 300 and precessing about an axis of rotation 302. The body of the air vehicle 100 is along the direction of the X-axis 300 (also referred to herein as the center of navigation (CON)). The displacement between the axis of rotation 302 and the X-axis 300 causes the air vehicle 100 to precess, and defines an angle of precession, $\Theta p$. The angle of precession is typically small, for example approximately half a degree. The precession is likely due to imperfections in the center of mass of the air vehicle 100 not being exactly located on the airframe center axis 300.

FIG. 3B is a block diagram of one embodiment of the geometry of accelerometer moment arms of an IMU 110 in the air vehicle 100. The IMU 110 comprises three accelerometers (see FIG. 3C), each of which measures acceleration in a different orthogonal direction (X, Y, or Z). X is along the center axis 300 which is slightly different from the direction of movement of the air vehicle 100. The X-axis also corresponds to the roll of the air vehicle 100. The Y-axis 304 and the Z-axis 306 correspond to the pitch and yaw of the air vehicle 100, respectively.

As shown in FIG. 3A, the air vehicle 100 may be rotating about a different axis 302 than its center axis 300. Due to precession, the lever arms for the Y and Z accelerometers are offset. As used herein, the lever arm for an accelerometer is the distance between the accelerometer and the center axis CON 300, in the direction the accelerometer is intended to measure.

FIG. 3C shows the air vehicle 100 with the direction of motion, X, going into the page. The IMU 110 comprises three accelerometers for measuring three orthogonal directions, 310-X, 310-Y, and 310-Z. The point 300 corresponds to the center axis and the point 302 corresponds to the actual axis of rotation (the point which the air vehicle 100 is spinning about). The lever arm error for the Y accelerometer 310-Y is dlev_y (320-Y). The lever arm error for the Z accelerometer 310-Z is dlev_z (320-Z). The lengths of dlev_y (320-Y) and dlev_z (320-Z) differ depending on the displacement of the axis of rotation 302 from the center axis 300. Because the lever arms are different when the air vehicle 100 is not spinning about its center line than when the air vehicle 100 is spinning about the center line, the measured accelerations will have apparent bias errors. Determining these bias errors allows the errors to be compensated for, leading to improved guidance of the air vehicle 100 by virtue of better acceleration estimates, devoid of these errors.

A radial acceleration bias model can be assumed to be of the form: Acceleration output (A)=fixed bias (b)+size effect delta (δ)+misalignment+SF non-linearity+lateral forces. This equation relates to ballistic flight prior to canard deployment. Under these conditions, the first two terms (fixed bias and size effect delta) are the most significant. The other terms are small enough to be negligible, so are assumed to be zero. With these cancellations, the acceleration output is given as:

$$A = b + \delta$$

The size effect delta, δ, is given by:

$$\delta = \omega^2 \text{dlev}$$

where dlev is the delta lever arm. The delta level arm results from rotation not about the IMU 110 CON 300 and its associated pre-determined lever arms, but about the round axis of rotation 302. The roll rate in the direction of motion is denoted ω. Therefore, the acceleration in the Y ($A_Y$) and Z ($A_Z$) directions are given as:

$$A_Y = b_Y + \omega^2 \text{dlev\_y}$$

$$A_Z = b_Z + \omega^2 \text{dlev\_z}$$

By taking at least two measurements of $A_Y$ and $A_Z$ at different times with different spin rates ω, $b_Y$, $b_Z$, dlev_y, and dlev_z can be calculated by simultaneous solution of these equations.

Figure 4:
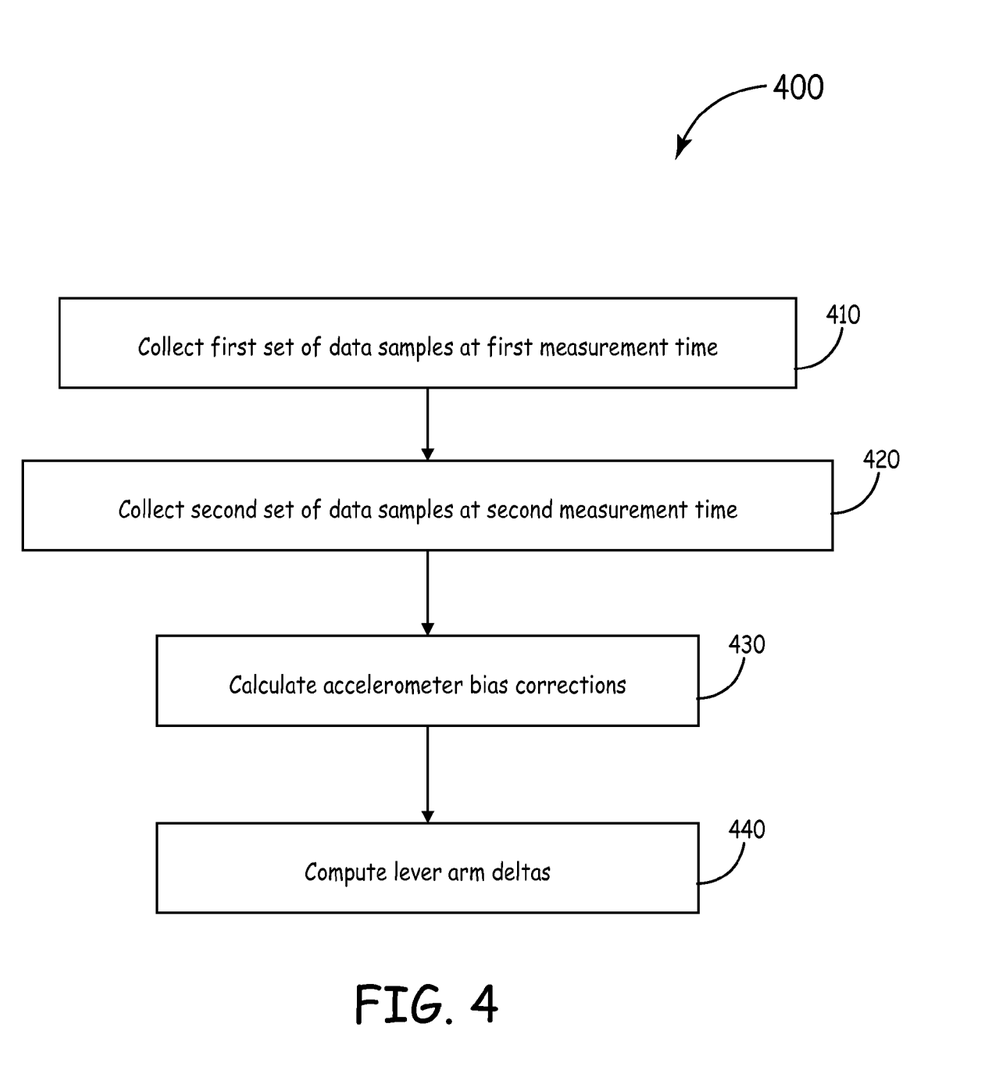
FIG. 4 is a flowchart of one embodiment of a method for estimating real-time bias errors of an air vehicle under high spin rate conditions.

FIG. 4 is a flowchart of one embodiment of a method 400 for estimating real-time bias errors of an air vehicle 100 under high spin rate conditions. Data is extracted from at least a first and a second point in time in the IMU data stream for the air vehicle 100 during ballistic, pre-canard flight. The first set of data samples is collected at a first measurement time (410). The second set of data samples is collected at a second measurement time (420). The IMU data is stored onboard the air vehicle 100 (such as in the memory 146), in the IMU 110, or the data is transmitted to a remote system (such as the host airframe control system 210). The set of data samples include the spin rate in the X direction (ω), the acceleration in the Y direction ($A_Y$), and the acceleration in the Z direction ($A_Z$).

Figure 5A:
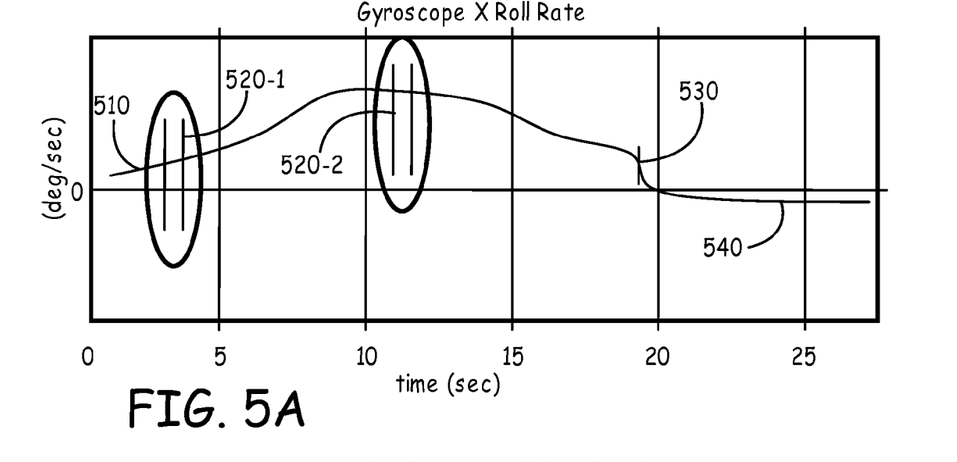
FIGS. 5A-5C are graphs of IMU data corresponding to one exemplary flight of an air vehicle.
Figure 5B:
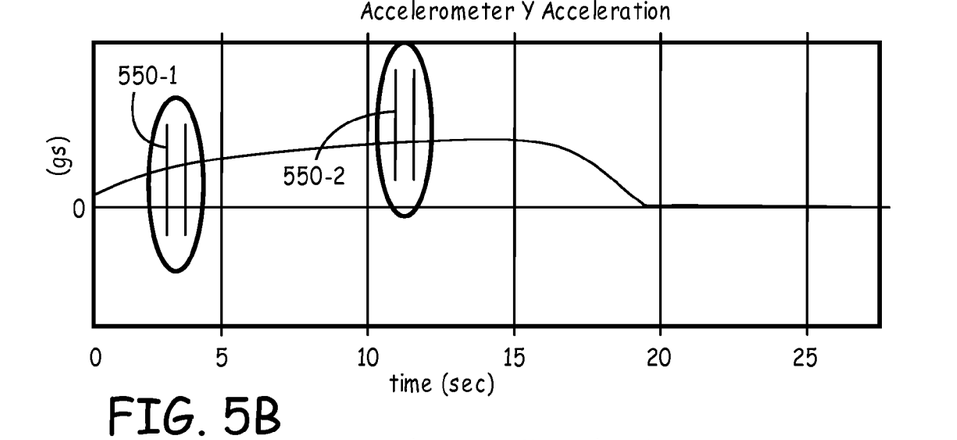
Figure 5C:
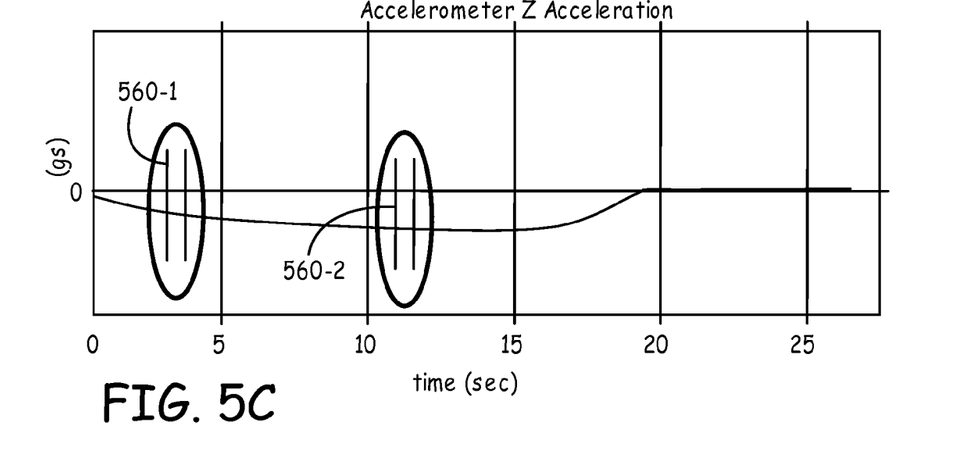

The (at least) two points in time in which data is extracted occur during the ballistic flight stage, when the air vehicle 100 is still spinning and no control surfaces have been deployed. For purposes of illustration, two such points in time are discussed. The two times are denoted by the subscripts 1 and 2. FIGS. 5A-5C are graphs of IMU data corresponding to one exemplary flight of an air vehicle. The data samples were taken at a 100 Hz data rate.

FIG. 5A is a graph of one embodiment of IMU data for the gyroscope X. The line 510 is the rotation rate ω of the air vehicle 100 in degrees per second (°/s or d/s). Point 530 marks the canard shock (that is, deployment of the canards 152). Once the canards 152 are deployed, the air vehicle 100 decreases its spin and can even be spun in the opposite direction. At point 540, the air vehicle 100 is spinning at its maximum rate in the opposite direction than it was spinning before point 530. At times later than 20 seconds, the air vehicle 100 is not spinning (or spinning slowly).

Measurement times 1 and 2 are chosen when the spin rates, $\omega_1$ and $\omega_2$, are different. The greater the difference between $\omega_1$ and $\omega_2$, the better the bias estimate will be. In one embodiment, Time 1 is not before $\omega_1$ exceeds a minimum value. In one implementation of that embodiment, the minimum value of $\omega_1$ is 1500°/s for over three seconds since the start of the flight. In FIG. 5A, $\omega_1$ is measured at Time 1 (520-1). At Time 2 (520-2), $\omega_2$ is measured. Embodiments select Time 2 to measure $\omega_2$ using different criteria, including, but not limited to, when $\omega_2$ is above a threshold value (such as greater than 2500°/s), a maximum value (that is, the maximum spin achieved for the particular flight), or a percentage of $\omega_1$ (such as when $\omega_2 > K\omega_1$, where K is a constant such as 1.25).

FIG. 5B is a graph of the IMU data for the accelerometer Y (310-Y), which plots the acceleration in gravitational force units (g) against the time of flight (seconds). The points 550-1 and 550-2 correspond to the measurement times 520-1 and 520-2 at which the spin rate w was measured. At Time 1 (550-1), the first data sample of the acceleration for accelerometer Y (310-Y) is measured, $A_{Y1}$. At Time 2 (550-2), the second data sample of the acceleration for accelerometer Y (310-Y) is measured, $A_{Y2}$. Similarly, FIG. 5C shows the acceleration that accelerometer Z (310-Z) detects during the course of flight. At Time 1 (560-1), the first acceleration for accelerometer Z is measured, $A_{Z1}$. At Time 2 (560-2), the second acceleration for accelerometer Z is measured, $A_{Z2}$. In one example, $\omega_1$, $A_{Y1}$, and $A_{Z1}$ were estimated between 4 and 5 seconds after firing and $\omega_2$, $A_{Y2}$, and $A_{Z2}$ were estimated between 12 and 13 seconds after firing. In this case the measurements are in fact average quantities of the 100 Hz data collected during those 1-second intervals. In one embodiment, all measurements in the first set of data samples are collected at Time 1, and all measurements in the second set of data samples are collected at Time 2. In other embodiments, some variation in the precise time the data samples are collected within a data set is allowed.

In an alternative embodiment, data samples are being continuously collected during flight. In this embodiment, only data samples within a window (such as half a second) are used. The windows are predetermined based on, for example, minimum and maximum spin rates, or percentages of spin rates, or after an elapsed time. The data for those windows are averaged together to form mean values for Time 1 and Time 2.

In another embodiment, a data quality metric (DQ) is computed. This data quality metric ensures that the standard deviation of the running averages of the data samples are below predetermined levels. In embodiments where $A_{Y1}$, $A_{Z1}$, $A_{Y2}$, and $A_{Z2}$ are calculated by averaging a plurality of data samples, the standard deviation of the data samples going into the average is checked to ensure that the standard deviation is not higher than a predetermined threshold level. This ensures the resulting averages are more reliable due to reducing the effects of noise and data spikes. Generally, the lower the standard deviation of the data going into the average estimates of bias ($A_{Y1}$, $A_{Z1}$, $A_{Y2}$, and $A_{Z2}$), the lower the uncertainty in the resultant bias estimates $b_Y$ and $b_Z$.

In one embodiment, an indicator of the quality of the estimate (also referred to herein as quality of the estimate indicator) is provided to the processing unit 130. The processing unit 130 determines whether to use the accelerometer bias estimate based on the quality of the estimate indicator. In one embodiment, a warning is outputted indicating that the quality of at least the first estimated accelerometer bias is below a threshold level. The warning can be outputted to a processing unit or to a user (such as through a display, speaker, software data item, or the like). If the quality of the estimate is below a predetermined threshold level, the processing unit 130 does not use the accelerometer bias estimate to correct the flight solution of the air vehicle 100. If the quality of the estimate is above the threshold level, the accelerometer bias estimate is used to correct the flight solution of the air vehicle 100. In another embodiment, a quality of the estimate indicator is outputted to the host airframe flight control system 210, which determines whether to use the accelerometer bias errors in flight control of the air vehicle 100.

In another embodiment, if the quality of the bias estimate is above the threshold level (that is, the estimate is good) and if the bias error estimate itself exceeds a pre-determined threshold (indicating an unacceptably large bias error), a warning is issued to the guidance system 150 indicating that no guidance should be attempted, that the canards 152 should not be deployed, or the airframe mission be aborted. In other words, the calculated estimated accelerometer bias is used to produce a warning message to a guidance system that the first accelerometer bias estimate is too large to enable proper navigation based on a threshold level of acceptable accelerometer bias errors.

Similarly, a test output indicating when the estimates are invalid (for example, an "estimates not valid" test output) is outputted to the processing unit 130, which indicates to an end user when to not use the estimates. Examples of when the estimates are not valid include when the standard deviation of the data going into the estimates of $A_{Y1}$, $A_{Z1}$, $A_{Y2}$, and $A_{Z2}$ exceed a predetermined threshold, if the uncertainty on the error estimate exceeds the amount of error that could be corrected after canard shock, or by comparison to prior nominal flight characteristics. The estimates could also be invalid if the difference between the first and second roll axis rate estimates ($\omega_2 - \omega_1$) is not sufficiently large. If $\omega_2 - \omega_1$ is less than a predetermined value, then the estimates $b_Y$ or $b_Z$ will be declared invalid.

Once all the data samples are gathered, the method 400 computes the accelerometer bias corrections (430), $b_Y$ and $b_Z$. The accelerometer bias corrections $b_Y$ and $b_Z$ are added, for the rest of the flight, to the real time raw accelerometer outputs $A_Y$ and $A_Z$. The accelerometer bias correction for accelerometer Y (310-Y), $b_Y$, is given as:

$$b_Y = \frac{A_{Y2}\omega_1^2 - A_{Y1}\omega_2^2}{\omega_1^2 - \omega_2^2}$$

and the accelerometer bias correction for accelerometer Z (310-Z), $b_Z$, is given as:

$$b_Z = \frac{A_{Z2}\omega_1^2 - A_{Z1}\omega_2^2}{\omega_1^2 - \omega_2^2}.$$

The lever arm deltas, dlev_y and dlev_z, are also computed (440). The lever arm delta for the accelerometer Y, dlev_y, is given as:

$$\text{dlev\_y} = \frac{A_{Y1} - A_{Y2}}{\omega_1^2 - \omega_2^2}$$

and the lever arm delta for the accelerometer Z, dlev_z, is given as:

$$\text{dlev\_z} = \frac{A_{Z1} - A_{Z2}}{\omega_1^2 - \omega_2^2}.$$

The lever arm deltas are used to calculate the misalignments of the air vehicle. The misalignment of the accelerometer Y, $\delta_Y$, is given by $\delta_Y = \omega^2 \text{dlev\_y}$. The misalignment of the accelerometer Z, $\delta_Z$, is given by $\delta_Z = \omega^2 \text{dlev\_z}$.

Additionally, the round-level misalignments can be calculated from the gyroscopes while the air vehicle 100 is spinning. The round-level misalignments are given as:

$$\frac{\omega_Y}{\omega_x} \text{ and } \frac{\omega_Z}{\omega_x}.$$

The round-level misalignments are used to provide corrections to observed gyroscope and accelerometer measurements.

The processing unit 130 is adaptable to provide different levels of bandwidth control of the inputs (that is, the data samples) to the correction routine 144. Parameters of bandwidth control include the periods of time over which the data samples are taken to average $A_{Y1}$, $A_{Z1}$, $A_{Y2}$, and $A_{Z2}$ and the time interval between those periods.

The memory 146 (likewise for the memory 240) can be implemented as any available media that can be accessed by a general purpose or special purpose computer or processor, or any programmable logic device. Suitable storage devices or media 140 (likewise for the memory 220) include, for example, forms of non-volatile memory, including by way of example, semiconductor memory devices (such as Erasable Programmable Read-Only Memory (EPROM), Electrically Erasable Programmable Read-Only Memory (EEPROM), and flash memory devices), magnetic disks (such as local hard disks and removable disks), and optical disks (such as Compact Disk-Read Only Memory (CD-ROM) disks). Moreover, the storage device or media 140 need not be local to the air vehicle 100. Typically, a portion of the software 142 executed by the processing unit 130 and one or more data structures used by the software 142 during execution are stored in the memory 146. The memory 146 comprises, in one implementation of such an embodiment, any suitable form of random access memory (RAM) now known or later developed, such as dynamic random access memory (DRAM). In other embodiments, other types of memory are used.

Embodiments provide bias estimation techniques during high spin rates for use in applications of guided weapons. Running the correction routine 144 enables an air vehicle 100 to have undesirably large accelerometer biases subtracted out to enable improved navigation to a target, and additional functionality is applied to in-flight testing of the air vehicle 100. Accelerometer bias and gyroscope misalignments are calculated from the IMU data. Correcting or compensating for the bias errors and misalignment improves the accuracy of IMU measurements after firing (for example, post-gunshot). Advantages of some of the embodiments include making guidance estimates of rate and acceleration less sensitive to inaccuracies and variation in airframe or projectile geometry of the air vehicle 100 and rotational flight errors manifesting themselves in periodic motion (precession, etc.) that produce apparent errors in rate and acceleration.

A number of embodiments of the invention defined by the following claims have been described. Nevertheless, it will be understood that various modifications to the described embodiments may be made without departing from the spirit and scope of the claimed invention. Additionally, it will be understood that aspects of any particular embodiment described may be combined with other embodiments even though those aspects may not be described in the other embodiment. Accordingly, other embodiments are within the scope of the following claims.

What is claimed is:

1. A method of estimating bias errors for an air vehicle in flight under high spin conditions, the method comprising:
   collecting a first set of data samples at a first time;
   collecting a second set of data samples at a second time;
   wherein the first time and the second time occur after deployment of the air vehicle and before canard shock;
   wherein the first and second sets of data samples comprise roll rate data from at least a first gyroscope and acceleration data from at least a first accelerometer; and
   calculating at least a first estimated accelerometer bias from the first and second sets of data samples.

2. The method of claim 1, wherein the first and second data samples further comprise acceleration data from a second accelerometer, wherein the second accelerometer measures acceleration in a direction orthogonal to that of at least the first accelerometer.

3. The method of claim 2, wherein calculating at least a first estimated accelerometer bias further comprises:
   calculating an estimated accelerometer bias for at least the first accelerometer, $b_Y$, given by $$b_Y = \frac{(A_{Y2}\omega_1^2 - A_{Y1}\omega_2^2)}{\omega_1^2 - \omega_2^2},$$

wherein $\omega_1$ is a roll rate from at least the first gyroscope at the first time, $\omega_2$ is a roll rate from at least the first gyroscope at the second time, $A_{Y1}$ is an acceleration measured by at least the first accelerometer at the first time, and $A_{Y2}$ is an acceleration measured by at least the first accelerometer at the second time; and
   calculating an estimated accelerometer bias for at least the second accelerometer, $b_Z$, given by $$b_Z = \frac{(A_{Z2}\omega_1^2 - A_{Z1}\omega_2^2)}{\omega_1^2 - \omega_2^2},$$

wherein $A_{Z1}$ is an acceleration measured by at least the second accelerometer at the first time and $A_{Z2}$ is an acceleration measured by at least the second accelerometer at the second time.

4. The method of claim 3, wherein calculating at least a first estimated accelerometer bias further comprises:
   calculating a level arm bias error for the first accelerometer, dlev_y, given by $$\text{dlev\_y} = \frac{A_{Y1} - A_{Y2}}{\omega_1^2 - \omega_2^2};$$

calculating a level arm bias error for the second accelerometer, dlev_z, given by $$\text{dlev\_z} = \frac{A_{Z1} - A_{Z2}}{\omega_1^2 - \omega_2^2};$$

calculate a misalignment error, $\delta_Y$, given by $\delta_Y = \omega^2 \text{dlev\_y}$; and
   calculate a misalignment error, $\delta_Z$, given by $\delta_Z = \omega^2 \text{dlev\_z}$.

5. The method of claim 1, further comprising correcting the subsequent real-time IMU estimated accelerometer outputs with the calculated estimated accelerometer bias.

6. The method of claim 1, further comprising producing a warning when the first accelerometer bias estimate is above a threshold level of acceptable accelerometer bias errors.

7. The method of claim 1, wherein the first point in time is approximately when a roll rate for at least the first gyroscope, $\omega$, is equal to or greater than approximately 1500 degrees per second.

8. The method of claim 1, wherein the second point in time is approximately when a roll rate for at least the first gyroscope, $\omega$, is at a maximum rate for the flight of the air vehicle.

9. The method of claim 1, further comprising producing a warning when the quality of at least the first estimated accelerometer bias is below a threshold level.

10. The method of claim 1, further comprising outputting an uncertainty estimate value indicating an uncertainty level associated with at least the first estimated accelerometer bias.

11. The method of claim 1, further comprising:
   transmitting the first and second set of data samples to a host airframe flight control system, wherein the host airframe flight control system calculates at least a first estimated accelerometer bias; and
   transmitting at least the first estimated accelerometer bias from the host airframe flight control system to the air vehicle.

12. An air vehicle operable for real-time estimates of acceleration bias errors, the air vehicle comprising:
   an airframe;
   an inertial measurement unit (IMU), wherein the IMU comprises a first gyroscope and at least a first and second accelerometer;
   a guidance system operable to deploy canards; and
   a processing unit, wherein the processing unit is configured to:
      compensate for an output of the first accelerometer using a first calculated accelerometer bias, wherein the calculations are generated based on data from the first accelerometer after deployment of the air vehicle and before a canard shock;
      compensate for an output of the second accelerometer using a second calculated accelerometer bias wherein the calculations are generated based on data from the second accelerometer after deployment of the air vehicle and before the canard shock; and
      guide the flight of the air vehicle based on the compensated outputs of the first and second accelerometers.

13. The air vehicle of claim 12, wherein the processing unit is further configured to:
   receive the first and second calculated accelerometer biases from a host airframe flight control system, wherein the host airframe flight control system is configured to:
      receive a first set of data samples from a first time and a second set of data samples from a second time from the air vehicle, wherein:

the first set of data samples comprise roll rate data from the first gyroscope and acceleration data from at least the first and second accelerometers at a first time;

the second set of data samples comprise roll rate data from the first gyroscope and acceleration data from at least the first and second accelerometers at a second time; and the first and second times are after deployment of the air vehicle;

calculate at least the first and second accelerometer bias; and transmit the first and second accelerometer biases.

14. The air vehicle of claim 13, wherein:

calculate at least a first and second accelerometer bias further comprises:

calculate the first accelerometer bias corresponding to the first accelerometer, $b_Y$, given by $$b_Y = \frac{(A_{Y2}\omega_1^2 - A_{Y1}\omega_2^2)}{\omega_1^2 - \omega_2^2},$$

wherein $\omega_1$ is a roll rate from the first gyroscope at the first time, $\omega_2$ is a roll rate from the first gyroscope at the second time, $A_{Y1}$ is an acceleration measured by the first accelerometer at the first time, and $A_{Y2}$ is an acceleration measured by the first accelerometer at the second time; and calculate the second accelerometer bias corresponding to the second accelerometer, $b_Z$, given by $$b_Z = \frac{(A_{Z2}\omega_1^2 - A_{Z1}\omega_2^2)}{\omega_1^2 - \omega_2^2},$$

wherein $A_{Z1}$ is an acceleration measured by the second accelerometer at the first time and $A_{Z2}$ is an acceleration measured by the second accelerometer at the second time; and guide the flight of the air vehicle further comprises:

guide the flight of the air vehicle based on corrections of misalignment errors of the air vehicle comprising:

calculate a level arm bias error for the first accelerometer, dlev_y, given by $$\text{dlev\_y} = \frac{A_{Y1} - A_{Y2}}{\omega_1^2 - \omega_2^2};$$

calculate a level arm bias error for the second accelerometer, dlev_z, given by $$\text{dlev\_z} = \frac{A_{Z1} - A_{Z2}}{\omega_1^2 - \omega_2^2};$$

calculate a misalignment error, $\delta_Y$, given by $\delta_Y = \omega^2 \text{dlev\_y}$; and calculate a misalignment error, $\delta_Z$, given by $\delta_Z = \omega^2 \text{dlev\_z}$.

15. The air vehicle of claim 12, wherein the processing unit is further configured to:

collect a first set of data samples at a first time and collect a second set of data samples at a second time, wherein the first and second points in time are after deployment of the air vehicle;

wherein the first and second data samples comprise roll rate data from the first gyroscope and acceleration data from at least the first and second accelerometers; and calculate at least a first and second accelerometer bias.

16. The air vehicle of claim 15, wherein calculate at least a first and second accelerometer bias further comprises:

calculate the first accelerometer bias corresponding to the first accelerometer, $b_Y$, given by $$b_Y = \frac{(A_{Y2}\omega_1^2 - A_{Y1}\omega_2^2)}{\omega_1^2 - \omega_2^2},$$

wherein $\omega_1$ is a roll rate from the first gyroscope at the first time, $\omega_2$ is a roll rate from the first gyroscope at the second time, $A_{Y1}$ is an acceleration measured by the first accelerometer at the first time, and $A_{Y2}$ is an acceleration measured by the first accelerometer at the second time;

calculate the second accelerometer bias corresponding to the second accelerometer, $b_Z$, given by $$b_Z = \frac{(A_{Z2}\omega_1^2 - A_{Z1}\omega_2^2)}{\omega_1^2 - \omega_2^2},$$

wherein $A_{Z1}$ is an acceleration measured by the second accelerometer at the first time and $A_{Z2}$ is an acceleration measured by the second accelerometer at the second time;

calculate a level arm bias error for the first accelerometer, dlev_y, given by $$\text{dlev\_y} = \frac{A_{Y1} - A_{Y2}}{\omega_1^2 - \omega_2^2};$$

calculate a level arm bias error for the second accelerometer, dlev_z, given by $$\text{dlev\_z} = \frac{A_{Z1} - A_{Z2}}{\omega_1^2 - \omega_2^2};$$

calculate a misalignment error, $\delta_Y$, given by $\delta_Y = \omega^2 \text{dlev\_y}$; and calculate a misalignment error, $\delta_Z$, given by $\delta_Z = \omega^2 \text{dlev\_z}$.

17. A program product for determining bias errors in an inertial measurement unit (IMU) of an air vehicle, the program-product comprising a processor-readable medium on which program instructions are embodied, wherein the program instructions are operable, when executed by at least one programmable processor included in the air vehicle, to cause a guidance system of the air vehicle to:

collect a first set of data samples at a first time and collect a second set of data samples at a second time, wherein the first and second points in time are after deployment of the air vehicle and before canard shock;

wherein the first and second data samples comprise roll rate data from at least a first gyroscope and acceleration data from at least a first and second accelerometer; and calculate at least a first and second estimated accelerometer bias.

18. The program product of claim 17, wherein calculate at least a first and second estimated accelerometer bias further comprises:
calculate the first estimated accelerometer bias corresponding to the first accelerometer, $b_Y$, given by $$b_Y = \frac{(A_{Y2}\omega_1^2 - A_{Y1}\omega_2^2)}{\omega_1^2 - \omega_2^2},$$

wherein $\omega_1$ is a roll rate from the first gyroscope at the first time, $\omega_2$ is a roll rate from the first gyroscope at the second time, $A_{Y1}$ is an acceleration measured by the first accelerometer at the first time, and $A_{Y2}$ is an acceleration measured by the first accelerometer at the second time;
calculate an estimated accelerometer bias corresponding to the second accelerometer, $b_Z$, given by $$b_Z = \frac{(A_{Z2}\omega_1^2 - A_{Z1}\omega_2^2)}{\omega_1^2 - \omega_2^2},$$

wherein $A_{Z1}$ is an acceleration measured by the second accelerometer at the first time and $A_{Z2}$ is an acceleration measured by the second accelerometer at the second time;
calculate a level arm bias error for the first accelerometer, dlev_y, given by $$\text{dlev\_y} = \frac{A_{Y1} - A_{Y2}}{\omega_1^2 - \omega_2^2};$$

calculate a level arm bias error for the second accelerometer, dlev_z, given by $$\text{dlev\_z} = \frac{A_{Z1} - A_{Z2}}{\omega_1^2 - \omega_2^2};$$

calculate a misalignment error, $\delta_Y$, given by $\delta_Y = \omega^2 \text{dlev\_y}$; and
calculate a misalignment error, $\delta_Z$, given by $\delta_Z = \omega^2 \text{dlev\_z}$.

19. The program product of claim 17, further comprising:
correct an output of the first accelerometer using the first calculated accelerometer bias;
correct an output of the second accelerometer using the second calculated accelerometer bias; and
wherein the corrected outputs of the first and second accelerometers are provided to the guidance system to guide the flight of the air vehicle.

20. The program product of claim 1, further comprising:
when the quality of the first estimated accelerometer bias is below a threshold level, output a warning;
when the quality of the second estimated accelerometer bias is below a threshold level, output a warning; and
output an uncertainty estimate value indicating an uncertainty level associated with the first and second estimated accelerometer biases.

* * * * *